(12) United States Patent
Langgartner et al.

(10) Patent No.: US 12,097,623 B2
(45) Date of Patent: Sep. 24, 2024

(54) COLLISION MONITORING OF A ROBOT

(71) Applicant: KUKA Deutschland GmbH, Augsburg (DE)

(72) Inventors: Verena Langgartner, Augsburg (DE); Anja Quittkat, Friedberg (DE)

(73) Assignee: KUKA Deutschland GmbH (DE)

( * ) Notice: Subject to any disclaimer, the term of this patent is extended or adjusted under 35 U.S.C. 154(b) by 1028 days.

(21) Appl. No.: 16/469,771

(22) PCT Filed: Nov. 20, 2017

(86) PCT No.: PCT/EP2017/079741
§ 371 (c)(1),
(2) Date: Jun. 14, 2019

(87) PCT Pub. No.: WO2018/108457
PCT Pub. Date: Jun. 21, 2018

(65) Prior Publication Data
US 2020/0078946 A1    Mar. 12, 2020

(30) Foreign Application Priority Data
Dec. 15, 2016  (DE) .................... 10 2016 014 989.2

(51) Int. Cl.
*B25J 9/16*    (2006.01)
(52) U.S. Cl.
CPC ............ *B25J 9/1676* (2013.01); *B25J 9/163* (2013.01); *G05B 2219/39082* (2013.01); *G05B 2219/49143* (2013.01)

(58) Field of Classification Search
CPC ........................................... G05B 2219/37624
See application file for complete search history.

(56) References Cited

U.S. PATENT DOCUMENTS

| | | | |
|---|---|---|---|
| 6,356,807 B1 * | 3/2002 | McGee | B25J 9/1692 |
| | | | 29/407.04 |
| 10,218,174 B2 * | 2/2019 | Kornprobst | B67C 3/007 |

(Continued)

FOREIGN PATENT DOCUMENTS

| | | |
|---|---|---|
| DE | 102007059481 A1 | 6/2009 |
| DE | 102009047033 A1 | 5/2011 |

(Continued)

OTHER PUBLICATIONS

European Patent Office; Search Report in related International Patent Application No. PCT/EP2017/079741 dated Feb. 13, 2018; 6 pages.

(Continued)

*Primary Examiner* — Ryan Rink
(74) *Attorney, Agent, or Firm* — Dorton & Willis, LLP

(57) ABSTRACT

A method for collision monitoring of a robot includes ascertaining an actual value of an axis load of at least one axis of the robot and identifying a collision of the robot if a deviation between this actual value and a reference value of the axis load exceeds a threshold value. The threshold value (Continued)

is ascertained as a function of at least one preceding deviation between the actual value and the reference value and/or at least one preceding reference value and/or the reference value, is ascertained as a function of a preceding actual value.

18 Claims, 1 Drawing Sheet

(56) References Cited

U.S. PATENT DOCUMENTS

| | | | | |
|---|---|---|---|---|
| 2011/0054680 A1* | 3/2011 | Nakata | ............... | B25J 9/1674 |
| | | | | 700/245 |
| 2012/0084020 A1* | 4/2012 | Maier | ............... | G05B 19/4062 |
| | | | | 702/41 |
| 2012/0221137 A1* | 8/2012 | Kettemer | ............... | G05B 19/4061 |
| | | | | 700/108 |
| 2014/0379126 A1* | 12/2014 | Ueberle | ............... | B25J 9/1676 |
| | | | | 700/245 |
| 2015/0057799 A1* | 2/2015 | Ueberle | ............... | B25J 9/1674 |
| | | | | 700/253 |
| 2015/0177084 A1* | 6/2015 | Inoue | ............... | G01L 5/18 |
| | | | | 73/862.541 |
| 2016/0001446 A1* | 1/2016 | Caldas | ............... | B25J 9/1605 |
| | | | | 702/190 |
| 2016/0026751 A1* | 1/2016 | Walther | ............... | G06F 30/17 |
| | | | | 703/13 |
| 2017/0302076 A1* | 10/2017 | Kornprobst | ............... | H02J 3/06 |
| 2018/0361578 A1* | 12/2018 | Muneto | ............... | B25J 19/06 |

FOREIGN PATENT DOCUMENTS

| | | |
|---|---|---|
| DE | 102013010290 A1 | 12/2014 |
| DE | 102013016878 A1 | 4/2015 |
| DE | 102014019035 A1 | 6/2015 |
| DE | 102014011012 A1 | 1/2016 |
| EP | 2482156 A1 | 8/2012 |
| EP | 2839934 A2 | 2/2015 |

OTHER PUBLICATIONS

European Patent Office; Written Opinion in related International Patent Application No. PCT/EP2017/079741 dated Feb. 13, 2018; 11 pages.

German Patent Office; Search Report in related German Patent Application No. 10 2016 014 989.2 dated Feb. 22, 2018; 5 pages.

* cited by examiner

COLLISION MONITORING OF A ROBOT

CROSS-REFERENCE TO RELATED APPLICATIONS

This application is a national phase application under 35 U.S.C. § 371 of International Patent Application No. PCT/EP2017/079741, filed Nov. 20, 2017 (pending), which claims the benefit of priority to German Patent Application No. DE 10 2016 014 989.2, filed Dec. 15, 2016, the disclosures of which are incorporated by reference herein in their entirety.

TECHNICAL FIELD

The present invention relates to a method and a controller for the collision monitoring of a robot, a robot assembly including the controller, as well as a computer program product for carrying out the method.

BACKGROUND

It is known from in-house practice to identify collisions of robots, if deviations between detected, actual values and expected, in particular, model-based ascertained values ("setpoint values") of axis loads exceed predefined threshold values.

Setpoint values may be of varying quality, in particular, due to varying environmental conditions such as, for example, increased friction related to temperature, different robot-guided payloads and the like, due to varying poses and movements, in particular, speeds and accelerations of the robot, due to varying and/or delayed processing and the like.

Accordingly, the specification of threshold values for the deviations still tolerated or the deviations already assumed as collision-related between actual values and setpoint values is cumbersome and a reliable detection of actual collisions with preferably minimal unwarranted responding of the collision monitoring is difficult.

The object of the present invention is to improve the operation, in particular, a collision monitoring of a robot, in particular, to reduce one or multiple of the problems outlined above.

SUMMARY

According to one embodiment of the present invention, one or multiple (movement) axes of a robot, which in one embodiment includes at least four, in particular, six, in particular, at least seven, axes and drives for adjusting the axes, is (in each case) monitored for collision.

According to one embodiment of the present invention, (in each case) an actual value of an axis load of the (respective) axis of the robot is ascertained, in particular, detected for this purpose, in particular, (continuously or periodically) an instantaneous actual value, and a collision of the robot, in particular, of the (respective) axis is identified if a deviation between this actual value and a reference value of the axis load exceeds a threshold value.

An axis load within the meaning of the present invention may comprise, in particular, a force or a torque acting on the axis, in particular, on its drive, in particular, on its gearing and/or motor, in particular, electric motor.

An actual value of an axis load is ascertained in one embodiment by means of a detection means, in particular, by means of at least one sensor, in particular, force sensor or torque sensor, of the axis and/or as a function of or on the basis of a power consumption of its drive.

The reference value in one embodiment is, in particular, in at least one (movement mode) operating mode a value of the axis load expected during collision-free operation or with no collision, which in one embodiment is predicted, in particular, pre-calculated and/or ascertained on the basis of a model, in particular, as a function of or on the basis of an external load, in particular, a contact load and/or payload, and/or, as a function, in particular, of an actual or measured, pose and/or movement, in particular, speed and/or acceleration of the robot. Such a value expected without collision or during collision-free operation, in particular, is generally referred to here as "setpoint value", in particular, since in one embodiment it may correspond to a drive load of the axis ascertained on the basis of a model.

According to a (first) aspect of the present invention, the threshold value for a (permissible or non-collision-related) deviation between the, in particular, instantaneous actual value and the, in particular, instantaneous reference value, in particular, one expected, in particular, therefor (without collision), in particular, predicted and/or model-based, or setpoint value of the axis load is ascertained as a function of or on the basis of one or of multiple deviation(s) between preceding (precedingly ascertained) corresponding actual value(s) and reference value(s) of the axis load, ("preceding deviation(s)"), in particular, deviation(s) of immediately preceding (precedingly ascertained) actual and reference values.

This is based on the consideration that an instantaneous deviation, which corresponds essentially to one or to multiple preceding deviation(s), which are not caused by a collision, but, for example, by varying environmental conditions, poses and movements, in particular, systematic (model) errors, in particular of the reference values, are likewise (again) caused as a result of this, and not by a collision. According to this (first) aspect, predictions based on past data are accordingly made for an instantaneous or future behavior.

Thus, in one embodiment, the threshold value may be advantageously automatically adapted to different environmental conditions, poses, movements and the like, and thus, in one embodiment the specification of threshold values is simplified and/or a reliable(more reliable) detection of actual collisions is enabled and/or the risk of an unwarranted responding of the collision monitoring is reduced.

In one embodiment, the threshold value is ascertained as a function of, in particular, proportional to an, in particular, sliding average of preceding deviations between actual reference value(s) and reference value(s). A (sliding) average may be a value ascertained generally in a manner customary in the art according to a specified calculation rule from two or more, in particular, immediately preceding deviations, in particular, their arithmetic, geometric or quadratic means or the like.

In one refinement, the, in particular, sliding average is ascertained over at least 5 milliseconds ("ms"), in particular, at least 10 ms, in particular, at least 50 ms and/or at most 200 ms, in particular, at most 150 ms, in particular, at most 100 ms.

With an average, in particular, sliding and/or ascertained over such a time period, it is possible in one embodiment to reduce the risk that the threshold value is gradually increased unintentionally during an actual collision.

In one embodiment, the threshold value is limited by a specified minimum and/or maximum threshold value or is limited downwardly to a specified minimum threshold value and/or upwardly to a specified maximum threshold value.

With a limitation to a specified minimum threshold value, it is possible in one embodiment to reduce the risk of an unwarranted responding of the collision monitoring, with a limitation to a specified maximum threshold value it is possible in one embodiment to reduce the risk of a non-detection of actual collisions.

In one embodiment, the threshold value is or becomes configurable or configured, in particular, scalable or scaled by a user.

In this way, it is possible in one embodiment to advantageously adapt application-specifically a sensitivity of the collision monitoring, for example, to different process requirements and/or safety requirements, robot configurations or the like.

According to another (second) aspect of the present invention, which may be implemented, in particular, in addition or alternatively to the aforementioned aspect, a or the threshold value for a (permissible or non-collision-related) deviation between the, in particular, instantaneous actual value and the, in particular, instantaneous reference value, in particular a, in particular, expected therefor (without collision), in particular, predicted and/or model-based, or setpoint value of the axis load is ascertained as a function of or on the basis of one or of multiple preceding corresponding or earlier reference values, in particular, its gradient or change over time.

This is based on the consideration that in the case of, in particular, stronger changes of the reference value (greater) deviations may occur without these being caused by a collision, and based on the further consideration that a, in particular, instantaneous or, in particular, immediately (following) change of the reference value may be estimated on the basis of one or of multiple preceding reference values, in particular, their change(s). Accordingly, predictions for an instantaneous or future behavior are made according to this (second) aspect based on past data.

Thus, in one embodiment, the threshold value may be advantageously automatically adapted to different environmental conditions, poses, movements and the like, and thus, in one embodiment, may simplify the specification of threshold values and/or enable a reliable, more reliable detection of actual collisions and/or reduce the risk of an unwarranted responding of the collision monitoring.

In one embodiment, the threshold value is ascertained as a function of a, in particular, sliding change of the reference value. In one embodiment, the (sliding) change in this case may be ascertained on the basis of a difference between at least one preceding reference value and the instantaneous reference value and/or of one or of multiple differences between (in each case) a preceding reference value and a likewise preceding but more recent reference value, in particular, through division by the corresponding (change) time period between these reference values. Thus, the threshold value in one embodiment may be ascertained as a function of a, in particular, sliding, average of preceding, in particular, immediately preceding changes of the reference value. A sliding is understood in the present case to mean, in particular, in a manner customary in the art, a movement simultaneous to an instantaneous point in time, or an updating on the basis of an instantaneous point in time, a sliding average to mean corresponding to a sliding change or to a sliding filter, in particular, an average or a change or a filter over a period of time which moves simultaneously to the instantaneous point in time.

In one refinement, the (sliding) change is ascertained over at least 5 ms, in particular, at least 10 ms, and/or at most 200 ms, in particular, at most 100 ms, in particular, at most 50 ms.

In this way, it is possible in one embodiment to advantageously predict the instantaneous change of the deviation.

In one embodiment, the threshold value is limited by a specified minimum and/or maximum threshold value.

With a limitation to a specified minimum threshold value, it is possible in one embodiment to reduce the risk of an unwarranted responding of the collision monitor, with a limitation to a specified maximum threshold value in one embodiment, the risk of a non-detection of actual collisions. In one embodiment, the maximum threshold value for this purpose amounts to at least twice, in particular, at least five times, and/or at most fifty times, in particular, at most 20 times the minimum threshold value.

In one embodiment, the threshold value is or becomes configurable or configured, in particular, scalable or scaled by a user.

In this way, it is possible in one embodiment to advantageously adapt application-specifically a sensitivity of the collision monitoring, for example, to different process requirements and/or safety requirements, robot configurations or the like.

In on embodiment, the threshold value is ascertained as a function of an instantaneous and/or, in particular, sliding, filtered factor, which is ascertained, in particular, non-linearly as a function of the change of the reference value, in particular, of the larger of the instantaneous and the (sliding) filtered factor. The factor in one embodiment increases more markedly with smaller changes of the reference value than with larger changes, in particular, in order to respond advantageously early(earlier).

With the use of the instantaneous factor, which is ascertained on the basis of the instantaneous (sliding) change, the threshold value is able to respond advantageously quickly. With the use of the (sliding) filtered factor, which is ascertained on the basis of a (sliding) filter via preceding (precedingly ascertained) factor values, the threshold value is advantageously slowly (more slowly) reduced when the reference value is varied only momentarily, with the use of the greater of the two values, both values are advantageously combined. In one embodiment, the factor is filtered over at least 10 ms, in particular, at least 30 ms, and/or at most 200 ms, in particular, at most 150 ms, in particular, at most 100 ms.

According to an additional (third) aspect of the present invention, which may be implemented in particular, in addition or alternatively to one or to both of the aforementioned aspects, a or the reference value is ascertained as a function of a preceding actual value, in particular, of an (additional) operating mode, in which in one embodiment the threshold value is independent of preceding deviations between the actual value and the setpoint value and/or of preceding setpoint values.

This is based on the consideration that, in particular, in the case of lower speeds, the quality of setpoint values may decrease, for example, due to non-modelled or only roughly modelled frictional influences, which then become relevant (more relevant), or the like. Thus, when commanding a robot to stop, for example, the result is rapidly constant setpoint values for its axis load, whereas, in particular for reducing tracking errors, actual values may continue to vary (significantly) contingent on the controller.

Thus, it is proposed in one embodiment, instead of the deviation of a setpoint value, unreliable, in particular, at low speeds, to compare the actual value itself for collision monitoring with a reference value, which is ascertained as a function of a preceding (collision-free) actual value, in one embodiment, is equal to this preceding (collision-free) actual value.

As explained above, a model quality, in particular, decreases at lower axis speeds. Accordingly, in one embodiment, a switch is made as a function a speed of the robot between an operating mode, also referred to without loss of generality as movement-operating mode, in which the threshold value is ascertained, in particular, according to the first aspect, as a function of at least one preceding deviation between actual value and reference value and/or, in particular, according to the second aspect, as a function of at least one preceding reference value, and an additional operating mode, also referred to without loss of generality, as stop operating mode, in which the reference value is ascertained, in particular, according to the preceding, last discussed additional (third) aspect, as a function of a preceding actual value, in particular, when falling below a specified threshold speed in the stop operating mode and/or when exceeding a, in particular, the same specified threshold speed (again) in the movement-operating mode.

In this way, it is possible in one embodiment to advantageously carry out in a speed-adapted manner in each case a collision monitoring particularly advantageous therefor. The speed (threshold speed) relevant for switching between the two operating modes may comprise, in particular, be, an, in particular, commanded and/or detected (axis) speed of the robot, in particular, of the respective or of its fastest or slowest axis, or a maximum or minimum axis speed of the robot, and/or a Cartesian speed of a robot-fixed reference, in particular, of its TCPs, the threshold speed, in particular, a speed tolerance of a stop monitoring.

The reference value ascertained (according to the third aspect) is ascertained in one embodiment as a function of a, in particular, the aforementioned, speed of the robot, of an, in particular, sliding, minimum value of preceding deviations between actual values, in particular, model-based values expected therefor (without collision) or setpoint values of the axis load and/or of a change of a tracking error of the axis.

In one refinement, one deviation each is observed between the actual value and the setpoint value, in particular, for a more rapid and/or softer switchover even in the moving operating mode and in each case a (new) reference value is ascertained on the basis of that actual value, which deviates the least from the associated setpoint value in the past sliding time window, in particular, in each case that actual value ascertained as the (new) reference value.

In this way, the actual value (most recently) detected with sufficient or high quality as collision-free is used as the reference value, as soon as setpoint values are ill-(less) suited for the collision monitoring.

In addition or alternatively, a (new) reference value is ascertained in one refinement, in particular, in the stop operating mode, in each case on the basis of a, in particular, instantaneous actual value, if a tracking error of the axis changes in the specified manner, in particular, is reduced by a certain value, in particular, the actual value in each case is ascertained as the (new) reference value) when changed by a certain value.

In this way, the specification of threshold values in one embodiment may continue to be simplified, even when reducing a (stop) tracking error and/or a reliable (more reliable) detection of actual collisions may be enabled and/or the risk of an unwarranted responding of the collision monitoring may be reduced. A tracking error in the present case is referred to, in particular, in a manner customary in the art, as a (controller) deviation between detected actual and commanded variables, in particular, axis positions.

In one embodiment, a safety response is carried out as a function of the identification of the collision, in particular, at least the (respective) axis, in particular, the entire robot or all of its axes are flexibly regulated to switch over, to brake, in particular, to stop. In one embodiment, damage to the colliding obstacle may be reduced as a result.

According to one embodiment of the present invention, a controller for collision monitoring of the robot, in particular, hardware- and/or software-engineered, in particular, program-engineered, is configured to carry out a method described herein and/or includes:

means for ascertaining (in each case) an actual value of an axis load of one or of multiple (moving) axes of the robot;

means for identifying a collision of the robot, if a deviation between this actual value and a reference value of the axis load exceeds a threshold value; and means for ascertaining the threshold value as a function of at least one preceding deviation between the actual value and the reference value and/or as a function of at least one preceding reference value and/or for ascertaining the reference value as a function of a preceding actual value.

In one embodiment, the controller or its corresponding means, includes: means for switching as a function of a speed of the robot between a (moving) operating mode, in which the threshold value is ascertained as a function of at least one preceding deviation between the actual value and the reference value and/or at least one preceding reference value, and an additional (stop) operating mode, in which the reference value is ascertained as a function of a preceding actual value.

In one embodiment, the controller or its corresponding means includes: means for ascertaining the threshold value as a function of a, in particular, sliding average ascertained, in particular, over at least 5 ms and/or at most 200 ms, of preceding deviations between the actual value and the reference value and/or as a function of a, in particular, sliding change of the reference value ascertained, in particular, over at least 5 ms and/or at most 200 ms, and/or for ascertaining the reference value as a function of a speed of the robot of a, in particular, sliding minimum value, ascertained in particular, over at least 5 ms and/or at most 200 ms, of preceding deviations between actual values and expected, in particular, model-based values of the axis load and/or of a change of a tracking error of the axis.

In one embodiment, the controller or its corresponding means, includes: means for ascertaining the threshold value as a function of an instantaneous and/or of a filtered factor, which is ascertained, in particular, non-linearly, as a function of the, in particular, sliding change of the reference value.

In one embodiment, the controller or its corresponding means, includes: means for limiting the threshold value by a specified minimum and/or maximum threshold value and/or for configuring, in particular, scaling the threshold value by a user.

In one embodiment, the controller or its corresponding means includes: means for carrying out a safety response, in particular, flexible regulation or braking, in particular, stopping of at least the (respective) axis, as a function of the identification of a collision.

A means within the meaning of the present invention may be hardware- and/or software engineered, in particular, may include a data-connected or signal-connected, in particular, digital processing unit, in particular, a microprocessor unit (CPU), preferably including a memory system and/or bus system, and/or one or multiple programs or program modules. The CPU may be designed to execute commands that are implemented as a program stored in a memory system, to detect input signals from a data bus and/or to deliver output signals to a data bus. A memory system includes one or multiple, in particular, different memory media, in particular, optical, magnetic, solid-state media and/or other non-volatile media. The program may be structured in such a way that it embodies or is able to carry out the method described herein, so that the CPU is able to carry out the steps of such a method and is thus able, in particular, to operate the robot, in particular, one or multiple of its axes or to monitor for collision.

In one embodiment, one or multiple, in particular, all steps of the method are carried out completely or in a partially automated manner, in particular, by the controller or its means.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
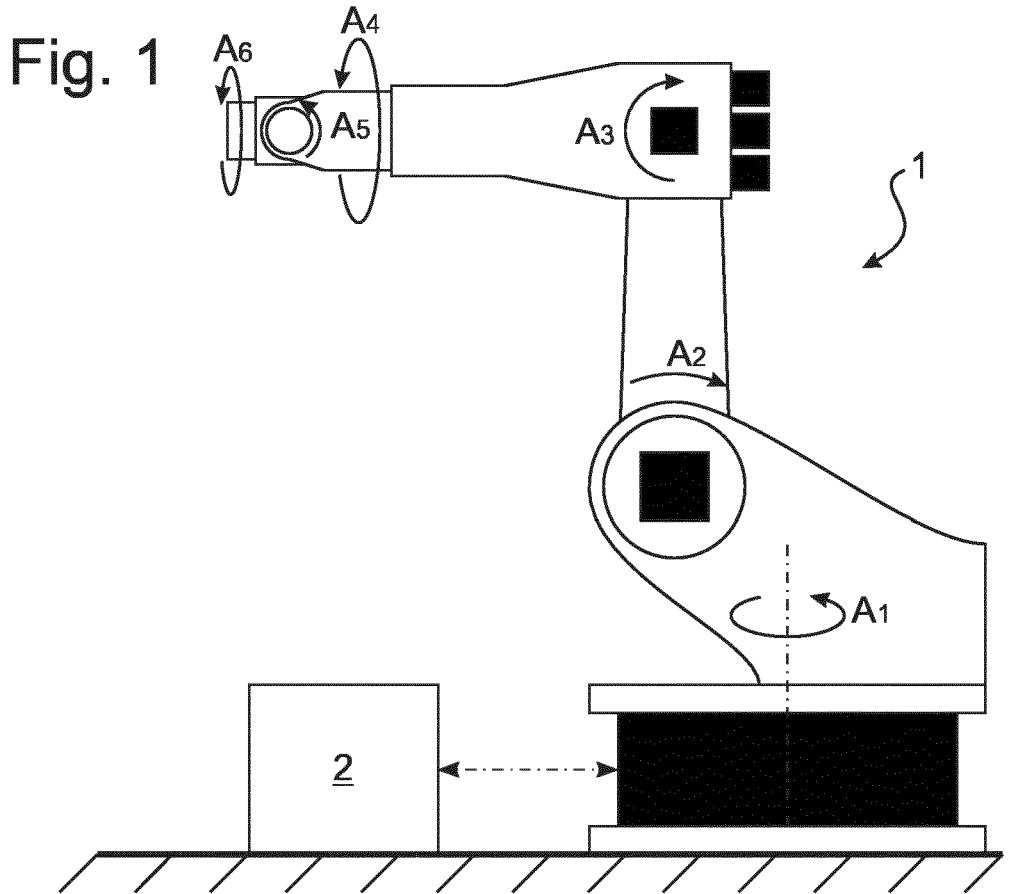
FIG. 1 shows a robot assembly, including a robot and a controller for collision monitoring of the robot according to one embodiment of the present invention.

FIG. 1 shows a robot assembly, including a robot 1 and a controller 2 for collision monitoring of the six axes $A_1$-$A_6$ of the robot.

Figure 2:
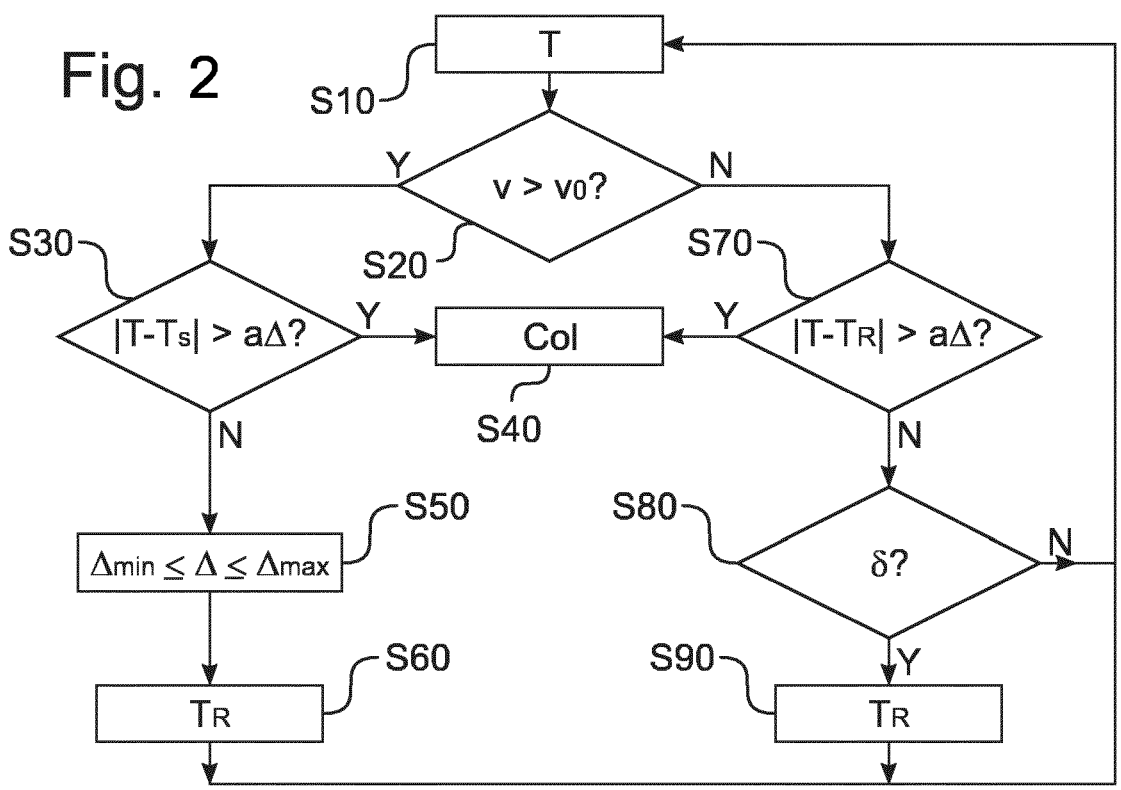
FIG. 2 shows a method for collision monitoring of the robot according to one embodiment of the present invention, in each case partially schematized.

For this purpose, the controller carries out a method for collision monitoring of the robot 1 explained below with reference to FIG. 2 according to one embodiment of the present invention.

In a step S10, an instantaneous actual value T of an axis load is detected for each axis $A_1$-$A_6$ (to be monitored), for example, by means of a drive current, via torque sensors on the axes or the like.

In a step S20, it is checked whether a speed v of the robot 1 exceeds a specified speed tolerance of a stop monitoring $v_0$.

As long as this is the case (S20: "Y"), the controller 2 or the method continues with step S30.

In this step, it is checked whether a deviation $|T-T_s|$ between the instantaneous actual value T from step S10 and a setpoint value $T_s$ expected for this axis load without collision, which is ascertained on the basis of a model, exceeds a threshold value $a\cdot\Delta$ resulting from a corresponding selection of a constant a scaled by a user.

If this is the case (S30: "Y"), the controller 2 or the method continues with step S40, in which a collision is identified and the robot 1 is stopped or switched into a flexible (more flexible) regulation.

As long as the deviation does not exceed the threshold value (S30: "N"), the controller 2 or the method continues with step S50.

In this step, the factor $\Delta$ of the threshold value and thus similarly the scaled threshold value $a\cdot\Delta$ itself is updated.

According to the first aspect explained above, the factor $\Delta$ is equated for this purpose with the sliding average over the last 80 ms of the preceding deviations $|T-T_s|$ ascertained in step S30.

If this average falls below a specified minimum threshold value $\Delta_{min}$, the factor $\Delta$ is then set to this minimum threshold value $\Delta_{min}$ instead and in this way limited downwardly accordingly.

It is apparent that the threshold value $a\cdot\Delta$ is thus updated on the basis of a sliding average of preceding (precedingly ascertained) deviations $|T-T_s|$: if these slowly become larger or smaller, this may result from a changing quality of the setpoint values $T_s$ or from a model underlying these values. The threshold value is advantageously automatically adapted to this, which advantageously reduces the frequency of an unwarranted responding of the collision monitoring and, at the same time, the effort in configuring the threshold value or the collision monitoring, while at the same time actual collisions having correspondingly rapid growing deviations may be reliably (more reliably) detected.

According to the second aspect explained above, a change $\Delta_T$ of the setpoint value $T_s$ is instead first ascertained in step S50 over the last 12 ms. An instantaneous factor F is then ascertained, which is not a non-linear function of this change $\Delta_T$, in particular, increases more strongly in the case of smaller changes than in the case of larger changes, for example, in the form F~ln($\Delta_T$+1) or a, in particular, linear approximation thereof. Moreover, this factor F (and thus also the threshold value) is limited upwardly, for example, to 9. This factor is (slidingly) filtered over the last 80 ms to a factor $F_m$. Then the larger of the instantaneous factor F and of the filtered factor $F_m$ is added to 1 and the result is multiplied by a specified minimum threshold value $\Delta_{min}$ with the factor $\Delta$ of the threshold value $a\cdot\Delta$: $a\cdot\Delta=a\cdot\Delta_{min}\cdot(1+\text{Max}\{F, F_m\})$.

In this way, the threshold value $a\cdot\Delta$ is updated and in the process limited downwardly to $a\cdot\Delta_{min}$ and upwardly to $a\cdot\Delta_{min}\cdot10$.

It is apparent that the threshold value $a\cdot\Delta$ is thus updated on the basis of a sliding change $\Delta_T$ of the setpoint value $T_s$: if this changes more markedly, this may reduce the quality of the setpoint values $T_s$ or of a model underlying these values, if in contrast, the change of the setpoint values $T_s$ is less marked, the quality of the setpoint values $T_s$ or of the model may improve accordingly. The threshold value is advantageously automatically adapted hereto, which advantageously reduces the frequency of an unwarranted responding of the collision monitoring due to unforeseen degradations of the quality of the setpoint values and, at the same time, the effort in configuring the threshold value or of the collision monitoring, while at the same time actual collisions are reliably (more reliably) detected.

In one modification, the first aspect and the second aspect may also be combined, for example, by using the larger, smaller or average of the two previously explained threshold values $a\cdot\Delta$ as the new threshold value $a\cdot\Delta$.

In a step S60, an (additional) reference value $T_R$ for the axis load is updated, which is used for the third aspect explained below.

In this step, the deviation $|T-T_s|$ ascertained in step S30 is compared in each case with a minimum deviation $(|T-T_s|)_{min}$ ascertained in an simultaneously sliding time period. If the instantaneous (instantaneously) ascertained deviation $|T-T_s|$ is smaller than this minimal deviation $(|T-T_s|)_{min}$, then the instantaneous (instantaneously) ascertained actual value T is adopted as new reference value $T_R$. In addition, the additional reference value $T_R$ may be limited to the maximum or minimum of the instantaneous actual value and/or setpoint value, in order to consistently obtain a value.

The controller 9 or the method then returns to step S10.

If in step S20 the speed v of the robot 1 does not exceed the specified threshold speed $v_0$ (S20: "N"), the controller 2 or the method continues with step S70.

In this stop operating mode, it is assumed (in contrast to the moving operating mode of the steps S30, S50 and S60), that the setpoint values or a model underlying these values are ill-(less) suited for a collision monitoring.

Thus, constant setpoint values rapidly occur, in particular, in the case of a commanded stop of the robot 1, which generally only compensate for the gravitation. In contrast, the actual values of the axis loads may, however, continue to vary, in particular, due to a position behavior of the regulator jitters or regulator humming, due to a reduction of residual tracking errors when approaching a stop pose or the like.

This results in deviations between actual values and setpoint values, which could lead to an unwarranted responding of the collision monitoring in step S30.

Therefore, the instantaneous actual value is instead compared in step S70 of the stop operating mode with the (additional) reference value $T_R$ ascertained in step S60, which corresponds to the actual value which, at a higher speed ($v_0$) and thus correspondingly better quality of the setpoint values or of the model, most recently exhibited the smallest deviation.

In step S70, it is possible to use a threshold value last ascertained in step S50, or another threshold value a·Δ, in particular, fixed or configurable by the user.

As in step S30, an exceedance of this threshold value a·Δ, by the deviation $|T-T_R|$ between the instantaneous actual value T from step S10 and the (additional) reference value $T_R$ (S70: "Y") via step S40 also results in step S70 in the identification of a collision and a stoppage or switch-over of the robots 1 into a flexible (more flexible) regulation.

Otherwise (S70: "N"), it is checked in step S80 whether a tracking error δ has decreased by a specified value.

If this is not the case (S80: "N"), the reference value $T_R$ is maintained and the controller 2 or the method returns to step S10.

Otherwise (S80: "Y"), the instantaneous actual value T is adopted beforehand in a step S90 as new reference value $T_R$ before the controller 2 or the method returns to step S10.

Thus, it is apparent that in the case of setpoint values as well, actual values continuing to vary due to a commanded stop of the robot 1, resulting, for example, from the reduction of tracking errors, do not result in an (unwarranted) identification of a collision. In this case the reference value $T_R$, with which the instantaneous actual value is compared, is continually updated already in the moving operating mode (cf. step S60), so that it is already available when switching to the stop operating mode and, in addition, also in the stop operating mode is adapted to the reduced tracking error and, therefore, to a reducing variation of the actual value (cf. step S90).

Although exemplary embodiments have been explained in the preceding description, it is noted that a variety of modifications is possible.

Thus, step S60 may, in particular, be carried out before step S60 and/or step S70 may be carried out before step S90.

It is also noted that the exemplary embodiments are merely examples, which are not intended to limit the scope of protection, the applications and the structure in any way. Instead, the preceding description offers the person skilled in the art a guideline for implementing at least one exemplary embodiment, wherein various changes, in particular, with respect to the function and arrangement of the described components may be undertaken, without departing from the scope of the invention, as it arises from the claims and from feature combination equivalent to the former.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS

1 Robot
2 Controller
$A_1$-$A_6$ Axis
T Instantaneous actual value
$R_R$ (additional) Reference value
$T_s$ Setpoint value (reference value)
$v_{(0)}$ Speed, (threshold speed)
a·Δ Threshold value
$\Delta_{min/max}$ Minimum/maximum threshold value
δ tracking error

What is claimed is:

1. A method for collision monitoring of a robot, comprising:
    ascertaining an actual value of an axis load of at least one axis of the robot; and
    identifying a collision of the robot if a deviation between the actual value and a reference value of the axis load exceeds a threshold value;
    wherein the threshold value is ascertained as a function of at least one preceding deviation between the actual value and the reference value.

2. The method of claim 1, further comprising:
    switching the robot between a first operating mode and a second operating mode as a function of a speed of the robot;
    wherein:
        in the first operating mode, the threshold value is ascertained as a function of at least one preceding deviation between the actual value and the reference value and/or at least one preceding reference value, and
        in the second operating mode, the reference value is ascertained as a function of a preceding actual value.

3. The method of claim 1, wherein the reference value is an expected value of the axis load.

4. The method of claim 2, wherein reference value is an expected value of the axis load when the robot is in the first operating mode.

5. The method of claim 3, wherein the expected value is a model-based value of the axis load.

6. The method of claim 1, wherein the threshold value is ascertained as a function of at least one of:
    an average of preceding deviations between the actual value and the reference value; or
    a change of at least one of:
        the reference value and/or the reference value as a function of a speed of the robot, a minimum value of preceding deviations between actual values and expected values of the axis load, or a tracking error of the axis.

7. The method of claim 6, wherein at least one of:

the average is a sliding average;

the change of the reference value, minimum value, or tracking error is a sliding change;

the minimum value is a sliding minimum value; or the expected values of the axis load are model-based values.

8. The method of claim 1, wherein:

the threshold value is ascertained as a function of at least one of an instantaneous factor or a filtered factor; and the instantaneous factor or the filtered factor is ascertained as a function of a change of the reference value.

9. The method of claim 8, wherein the instantaneous factor or the filtered factor is ascertained non-linearly.

10. The method of claim 7, wherein at least one of:

at least one of the sliding average or the sliding change is ascertained over at least 5 ms and/or at most 200 ms; or the factor is filtered over at least 10 ms and/or at most 200 ms.

11. The method of claim 1, wherein the threshold value is limited by at least one of a specified minimum threshold value or a specified maximum threshold value.

12. The method of claim 1, wherein the threshold value is configurable by a user.

13. The method of claim 12, wherein the threshold value is scalable by a user.

14. The method of claim 1, further comprising:

executing a safety response in response to the identification of a collision.

15. The method of claim 14, wherein the safety response comprises at least one of:

flexibly regulating the axes of the robot;

braking the axes of the robot; or stopping the axes of the robot.

16. A controller for collision monitoring of a robot, the controller comprising:

means for ascertaining an actual value of an axis load of at least one axis of the robot;

means for identifying a collision of the robot if a deviation between the actual value and a reference value of the axis load exceeds a threshold value; and means for ascertaining the threshold value as a function of at least one preceding deviation between the actual value and the reference value.

17. A robot assembly, comprising:

a robot; and a controller configured for collision monitoring of the robot in accordance with the method of claim 1.

18. A computer program product, including a program code stored on a non-transient computer readable medium, that when executed by a robot controller, causes the controller to:

ascertain an actual value of an axis load of at least one axis of the robot; and identify a collision of the robot if a deviation between the actual value and a reference value of the axis load exceeds a threshold value;

wherein the threshold value is ascertained as a function of at least one preceding deviation between the actual value and the reference value.

* * * * *